(12) United States Patent
Kirihara et al.

(10) Patent No.: US 9,473,007 B2
(45) Date of Patent: Oct. 18, 2016

(54) OSCILLATING ROTARY SWING ACTUATOR WITH ROTARY SOLENOID AND PROJECTING FIXED YOKE

(75) Inventors: Takeshi Kirihara, Gumma (JP); Takaya Kato, Gumma (JP); Osamu Sekiguchi, Gumma (JP); Norihisa Imaizumi, Gumma (JP); Shoji Oiwa, Gumma (JP)

(73) Assignee: NIDEC SERVO CORPORATION, Gumma (JP)

( * ) Notice: Subject to any disclaimer, the term of this patent is extended or adjusted under 35 U.S.C. 154(b) by 760 days.

(21) Appl. No.: 13/988,921

(22) PCT Filed: Feb. 14, 2012

(86) PCT No.: PCT/JP2012/053382
§ 371 (c)(1),
(2), (4) Date: May 22, 2013

(87) PCT Pub. No.: WO2012/111658
PCT Pub. Date: Aug. 23, 2012

(65) Prior Publication Data
US 2013/0249326 A1    Sep. 26, 2013

(30) Foreign Application Priority Data

Feb. 17, 2011    (JP) .................... 2011-032524
Jan. 26, 2012    (JP) .................... 2012-013862

(51) Int. Cl.
| | | |
|---|---|---|
| H02K 33/16 | (2006.01) | |
| H01F 7/14 | (2006.01) | |
| H02K 33/00 | (2006.01) | |

(52) U.S. Cl.
CPC ............ *H02K 33/16* (2013.01); *H01F 7/14* (2013.01); *H02K 33/00* (2013.01)

(58) Field of Classification Search
CPC ......... H02K 33/16; H02K 33/00; H01F 7/14
USPC ........................... 310/36, 38; 335/91–92
See application file for complete search history.

(56) References Cited

U.S. PATENT DOCUMENTS

| | | |
|---|---|---|
| 7,688,169 B2 | 3/2010 | Zhao |
| 2006/0049701 A1 | 3/2006 | Sato |
| 2009/0051471 A1 | 2/2009 | Zhao |

FOREIGN PATENT DOCUMENTS

| | | |
|---|---|---|
| JP | 58-193776 U | 12/1983 |
| JP | 11-178306 A | 7/1999 |
| JP | 2009-038874 A | 2/2009 |
| JP | 2010-154627 A | 7/2010 |
| WO | 2006/129596 A1 | 12/2006 |

OTHER PUBLICATIONS

Official Communication issued in International Patent Application No. PCT/JP2012/053382, mailed on Apr. 10, 2012.

*Primary Examiner* — Burton Mullins
(74) *Attorney, Agent, or Firm* — Keating & Bennett, LLP

(57) ABSTRACT

A rotary solenoid includes a swing yoke to which two magnets are fixed and a fixed yoke including projection portions at opposite sides thereof. An electromagnetic coil including a major magnetic pole is arranged at a center of the fixed yoke. The rotary solenoid is arranged to define a magnetic circuit extending through one of the magnets, the major magnetic pole, the fixed yoke, the projection portion, and the other magnet at a shortest distance.

13 Claims, 12 Drawing Sheets

OSCILLATING ROTARY SWING ACTUATOR WITH ROTARY SOLENOID AND PROJECTING FIXED YOKE

BACKGROUND OF THE INVENTION

1. Field of the Invention

The present invention relates to a rotary solenoid and more specifically to a rotary solenoid configured to repeatedly rotate an output shaft within a specified angular range.

2. Description of the Related Art

A rotary solenoid for repeatedly rotating an output shaft within a specified angular range has heretofore been used as a drive power source for industrial machines. As the rotary solenoid of this kind, there is known, e.g., a so-called radial air-gap rotary solenoid in which a magnet and an electromagnetic coil are arranged in an opposing relationship along a rotation direction of an output shaft with a space left therebetween (see Japanese Patent No. 3240351). However, the radial air-gap rotary solenoid is required to become larger in size due to the arrangement of the electromagnetic coil or other causes. Thus, the radial air-gap rotary solenoid tends to become costly.

In recent years, there is proposed a so-called axial air-gap rotary solenoid in which a magnet and an electromagnetic coil are arranged along a direction parallel to an output shaft with a space left therebetween (see Japanese Patent Application Publication No. 2009-038874). In the axial air-gap rotary solenoid, two magnets juxtaposed to have different polarities are arranged in an axially opposing relationship with an electromagnetic coil having a major magnetic pole arranged at the center thereof. A swing yoke (back yoke) made of a magnetic material is arranged at the opposite side of the magnets from the electromagnetic coil with a space left therebetween. Thus, the axial air-gap rotary solenoid has a structure which is advantageous with respect to size reduction.

In the axial air-gap rotary solenoid, upon supplying an electric current to the electromagnetic coil, a swing unit is swung in one direction. The movement of the swing unit is restrained as a portion of the swing unit comes into contact with a stopper. If the electric current is supplied to the electromagnetic coil in a direction opposite to the aforementioned direction, the swing unit is swung in the reverse direction. The movement of the swing unit in the reverse direction is restrained as the swing unit comes into contact with another stopper. Accordingly, an output shaft can be repeatedly rotated within a specified angular range by controlling the supply of the electric current to the electromagnetic coil. If the electric current supplied to the electromagnetic coil is cut off, the swing unit is self-held by the magnetic attraction force of the magnets in the position where the swing unit makes contact with the stopper.

Depending on the use thereof, the rotary solenoid of this kind is required to have a suitable self-holding force and an operation speed characteristic while staying small in size. For that reason, an expensive rare-earth sintering material must be used as the magnet in most cases.

FIG. 17 is a section view of a conventional rotary solenoid having an axial air-gap structure, explaining a magnetic flux route in a self-holding state when no electric current is supplied. A housing 200 of a rotary solenoid includes an upper case 201, a lower case 202, and a side case 203 arranged to surround the periphery between the upper case 201 and the lower case 202. The upper case 201, the lower case 202, and the side case 203 are made of a magnetic material. An output shaft 204 is supported between the upper case 201 and the lower case 202. The output shaft 204 has an upper portion as an output end protruding beyond the upper case 201. Within the housing 200, a swing yoke 205 extending parallel to a plane orthogonal to the output shaft 204 is attached to the output shaft 204 in a position near the upper case 201. Two magnets 206 and 207 are attached to the tip end (free rotation end) of the swing yoke 205 by virtue of non-magnetic holders not shown. The magnets 206 and 207 are magnetized in the up-down direction parallel to the axial direction of the output shaft 204 and are juxtaposed so that the magnetic poles differing from each other can face downward. The magnets 206 and 207 are opposed to the swing yoke 205 across air gaps.

A ring-shaped electromagnetic coil 209 having a major magnetic pole 208 arranged at the center thereof is provided below the tip end of the swing yoke 205. The lower end portion of the major magnetic pole 208 is supported on and magnetically coupled to the lower case 202. Stoppers 210 and 211 facing each other along the swing direction of the swing yoke 205 are attached to the side case 203 in the height position corresponding to the magnets 206 and 207.

In the rotary solenoid of this configuration, if an electric current is supplied to the electromagnetic coil 209 in the state shown in FIG. 17 to thereby excite the major magnetic pole 208 so that the upper portion thereof can become an N-pole, a magnetic repulsion force is generated by one magnet 206. This is because the lower surface of one (right) magnet 206 facing the electromagnetic coil 209 is an N-pole. Thus, a swing force acts on the swing yoke 205, thereby swinging the swing yoke 205 so that one magnet 206 can move away from the major magnetic pole 208. In this swinging process, the repulsion force of one magnet 206 is gradually reduced along with the swinging movement of the swing yoke 205. On the other hand, the attraction force of the other (left) magnet 207 acting on the major magnetic pole 208 is gradually increased because the lower surface of the other magnet 207 is an S-pole. Thus, the swinging movement of the swing yoke 205 is continuously performed until a portion of the swing yoke 205 comes into contact with the stopper 210.

In the state that the other magnet 207 faces the major magnetic pole 208 of the electromagnetic coil 209, an electric current is supplied to the electromagnetic coil 209 in the direction opposite to the aforementioned direction to thereby excite the electromagnetic coil 209 so that the upper portion of the major magnetic pole 208 will become an S-pole. In this case, the swing yoke 205 is swung in the direction opposite to the aforementioned direction, thus coming into the state shown in FIG. 17. Even if the supply of the electric current to the electromagnetic coil 209 is stopped after finishing the swinging movement of the swing yoke 205, the swing position of the swing yoke 205 is kept as it is, because one of the magnets 206 and 207 magnetically attracts the major magnetic pole 208.

Arrows shown in FIG. 17 indicate the flow of magnetic flux. The magnetic path of the magnetic flux coming out from the N-pole of one magnet 206 includes: a route r1 in which the magnetic flux flows through the major magnetic pole 208, the lower case 202, and the side case 203 and then comes back to the S-pole of the other magnet 207 via an air gap; and a route r2 in which the magnetic flux entering the side case 203 flows from the upper case 201 toward the swing yoke 205 arranged above one magnet 206 and then comes back to one magnet 206 via an air gap.

In this case, each of the routes r1 and r2 has a long air gap. This makes it necessary for the magnetic flux to pass through the air gaps, which leads to an increased magnetic resistance. Moreover, air gaps exist between the swing yoke 205 and the magnets 206 and 207. Therefore, a large magnetic resistance is generated in these air gaps. A similar magnetic circuit is produced even when an electric current is supplied to the electromagnetic coil 209.

In the conventional configuration disclosed in Japanese Patent Application Publication No. 2009-38874, as described with reference to FIG. 17, the magnetic circuit of the rotary solenoid is formed through the use of the cases made of a magnetic material. Thus, the magnetic path becomes longer. In addition, the magnetic circuit suffers from a significantly large magnetic resistance and a reduced efficiency. For that reason, the grade of the magnet is increased or the thickness of the magnet is made unnecessarily large in order to obtain a specified characteristic. Further, the permeance modulus is increased to cope with demagnetization of the magnet. This poses a problem in that the material cost becomes too high and the size of the rotary solenoid grows large.

SUMMARY OF THE INVENTION

Preferred embodiments of the present invention provide a magnetic circuit suitable for a rotary solenoid which permits reducing the material cost and making the rotary solenoid smaller in size.

A rotary solenoid in accordance with a preferred embodiment of the present invention includes a swing yoke and a fixed yoke which are both made of a magnetic material. The rotary solenoid is arranged to define a magnetic circuit at a shortest distance. Therefore, even if a magnet made of a material having a low grade material, e.g., if a material having a low residual magnetic flux density is used; it is possible to provide a sufficient magnetic path. Thus, in accordance with a preferred embodiment of the present invention, there is provided a structure capable of maintaining properties equal to or higher than those of conventional rotary solenoids.

A rotary solenoid according to a preferred embodiment of the present invention includes: an electromagnetic coil including a major magnetic pole arranged at a center thereof; two axially-magnetized magnets; a swing yoke including a planar surface portion to which the magnets are fixed in a juxtaposed state such that magnetic poles differing from each other face the electromagnetic coil across air gaps; and an output shaft arranged in an orthogonal relationship with the planar surface portion and in a parallel relationship with the major magnetic pole so as to rotatably support the swing yoke. The swing yoke is swung in forward and reverse directions at a specified angle θ with respect to a centerline interconnecting a center of the output shaft and a center of the major magnetic pole. The rotary solenoid further includes a fixed yoke arranged to support the electromagnetic coil and magnetically coupled with the major magnetic pole. The fixed yoke includes projection portions extending upward from opposite sides of the fixed yoke near an outer periphery of the electromagnetic coil so as to have the same or substantially the same height as the major magnetic pole. The projection portions are arranged such that, when an inner edge of one of the magnets comes closest to the major magnetic pole within a swing range of the swing yoke, one of the projection portions comes closest to an outer edge of the other magnet existing at an opposite side from the inner edge.

In the rotary solenoid of this configuration, if the inner edge of one of the magnets comes closest to the major magnetic pole of the electromagnetic coil within the swing range of the swing yoke when the electromagnetic coil remains de-energized, the outer edge of the other magnet comes closest to the other projection portion of the fixed yoke. For that reason, a closed loop of magnetic flux extending from one magnet to the other magnet via the major magnetic pole, the fixed yoke and the projection portions is provided. Thus, it becomes possible to provide a magnetic circuit having a shortest distance. When the inner edge of the other magnet comes closest to the major magnetic pole of the electromagnetic coil, the outer edge of one of the magnets comes closest to one of the projection portions. Therefore, as described above, it becomes possible to provide a magnetic circuit having a shortest distance.

If an electric current is supplied to the electromagnetic coil in the above-described stop state, electromagnetic forces act as follows.

(1) The major magnetic pole is excited to have the same polarity as one of the magnets, thereby attracting the other magnet.

(2) Since a magnetic field opposite to the major magnetic pole is generated in the projection portions extending upward from the opposite sides of the fixed yoke, the other projection portion applies a repulsion force to the other magnet.

(3) One of the projection portions applies an attraction force to one of the magnets.

These three forces act in the same rotational direction. It is therefore possible to obtain a strong electromagnetic force.

Even if the rotary solenoid is returned to the de-energized state in this movement position, as described above, the other magnet is attracted toward the major magnetic pole arranged in the central portion of the electromagnetic coil. One of the magnets is attracted toward one of the projection portions of the fixed yoke. Even if an electric current is cut off in this manner, there is reliably provided a magnetic path in which the magnetic flux generated in the other magnet flows from the fixed yoke and the projection portions into one of the magnets via the major magnetic pole of the electromagnetic coil and then comes back to the other magnet via the swing yoke. This makes it possible to maintain the stop condition.

The rotary solenoid of preferred embodiments of the present invention provides an optimal magnetic circuit as described above and produces the following effects.

(1) The same output characteristic as available in the conventional art can be obtained by use of a magnet having a low grade (i.e., a low residual magnetic flux density, etc.). In a case where a magnet having the same grade as the conventional one is used, it is possible to significantly reduce the thickness (for example, by one half or so). This makes it possible to greatly reduce the material cost of the magnet.

(2) Since the inertial moment of the swing unit is reduced due to the change of the material and shape of the magnet, it is possible to shorten the response time of the rotary solenoid. In addition, it becomes possible to reduce the electric current supplied to the electromagnetic coil. This leads to an increase in efficiency.

(3) The outer case unit need not necessarily be made of a magnetic material and, therefore, may be made of a low-priced resin material.

(4) By directly fixing the swing yoke to the output shaft, it becomes possible to reduce the number of parts required in the rotary solenoid.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 6A and 6B are a plan views illustrating the operation of the rotary solenoid shown in FIG. 1, in which FIG. 6A shows the swing yoke being moved in one direction, and FIG. 6B shows the swing yoke being moved in the other direction.

DETAILED DESCRIPTION OF THE PREFERRED EMBODIMENTS

Hereinafter, preferred embodiments of rotary solenoids of the present invention will now be described with reference to the accompanying drawings.

First Preferred Embodiment

Figure 1:
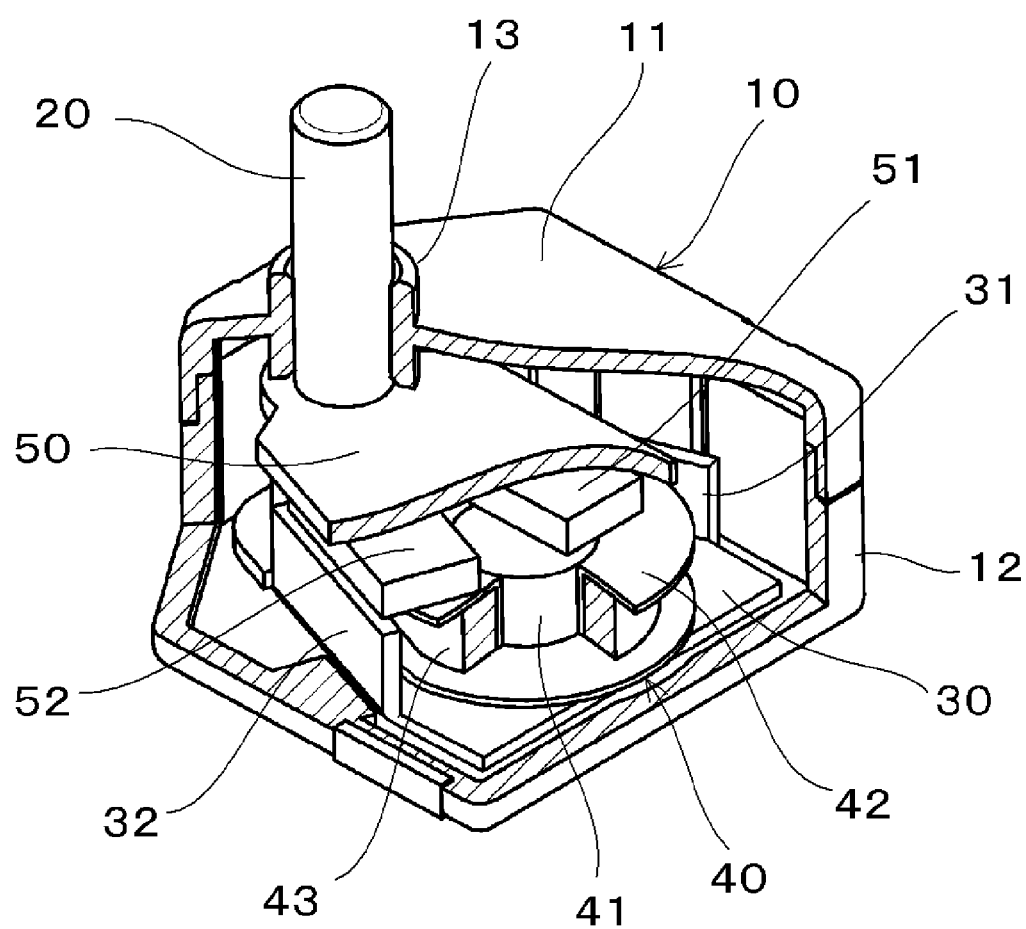
FIG. 1 is a partially cutaway perspective view of a rotary solenoid according to one preferred embodiment of the present invention.

FIG. 1 shows a rotary solenoid according to one preferred embodiment of the present invention. In this rotary solenoid, an output shaft 20 protruding beyond the upper surface of a box-shaped outer case unit 10 is repeatedly swung at a swing angle of ±θ. The outer case unit 10 preferably includes a structure in which an upper case 11 and a lower case 12 are coupled together at a side portion. The upper case 11 and the lower case 12 are preferably made of, e.g., a resin material. Bearing portions 13 are preferably defined as a single monolithic member together with the upper case 11 and the lower case 12 in regions corresponding to the output shaft 20 extending in the up-down direction. The bearing portions 13 rotatably support the output shaft 20. The lower end portion of the output shaft 20 is supported on the lower case 12. The upper portion of the output shaft 20 protrudes outward from the bearing portion 13 of the upper case 11.

Figure 4:
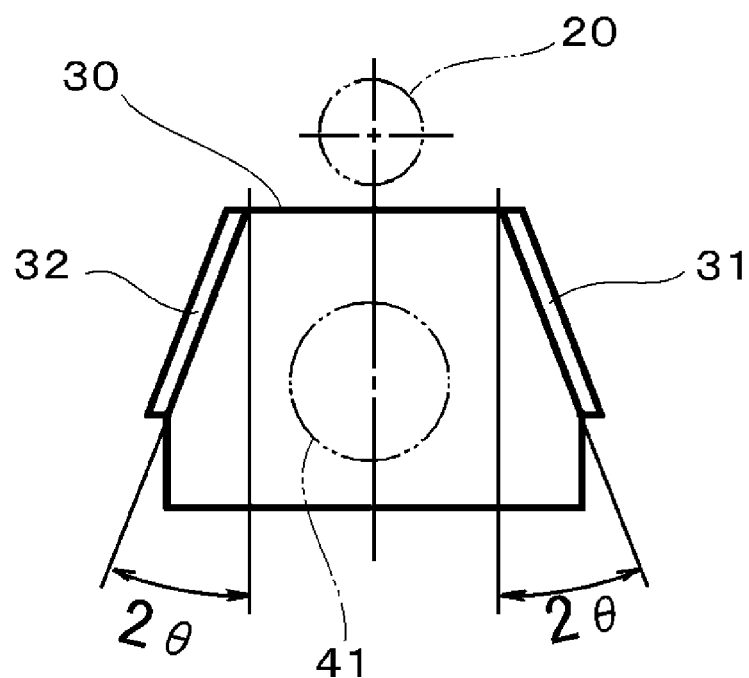
FIG. 4 is a plan view of the fixed yoke shown in FIG. 3.

A fixed yoke 30 made of a magnetic material is attached to the inner upper surface of the lower case 12. An electromagnetic coil 40 is fixed to the central portion of the fixed yoke 30. The electromagnetic coil 40 includes a major magnetic pole 41 made of a magnetic material and arranged at the center of the electromagnetic coil 40. A coil wire 43 is preferably wound around the major magnetic pole 41 through a coil bobbin 42. The lower end portion of the major magnetic pole 41 is fixed to and magnetically coupled with the fixed yoke 30. As shown in FIG. 4, the fixed yoke 30 is preferably arranged into a symmetrical polygonal shape. Projection portions 31 and 32 positioned at the opposite sides of the outer periphery of the electromagnetic coil 40 and bent upward preferably by, for example, a bending work in a parallel or substantially parallel relationship with the axis of the output shaft 20 are arranged in the left and right portions of the fixed yoke 30. The projection portions 31 and 32 are arranged to have the same or substantially the same height as the major magnetic pole 41 of the electromagnetic coil 40.

Figure 2:
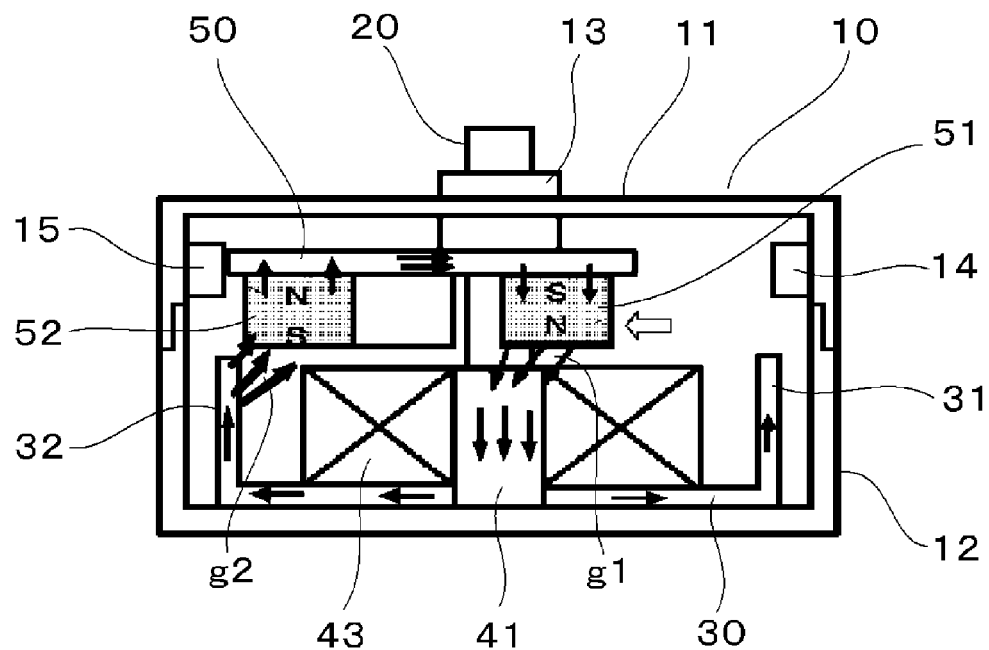
FIG. 2 is a front sectional view explaining a magnetic path provided in the rotary solenoid shown in FIG. 1.
Figure 5:
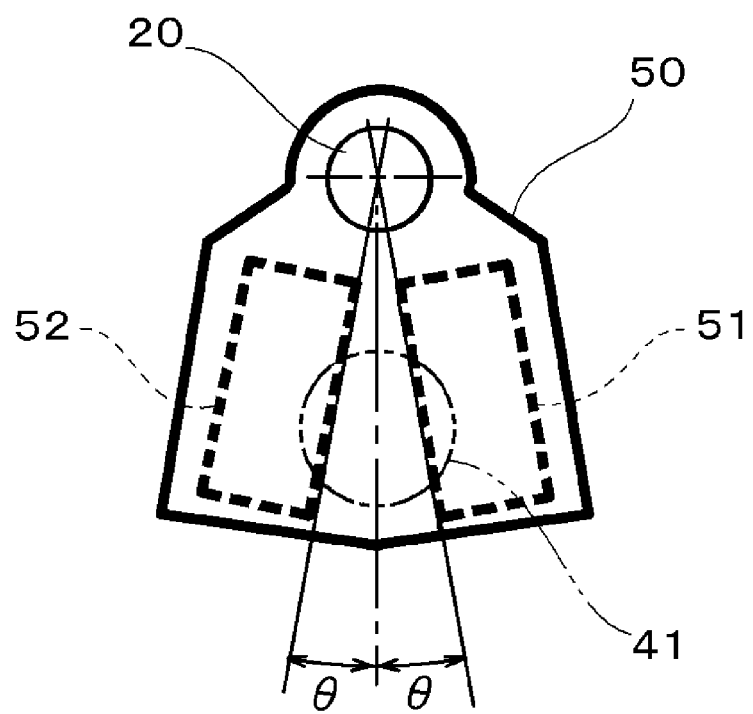
FIG. 5 is a plan view of the swing yoke shown in FIG. 3.

A swing yoke 50 is preferably fixed to the output shaft 20 in an upper position within the outer case unit 10 so that the swing yoke 50 can intersect the output shaft 20 at a right angle. The swing yoke 50 is defined by a magnetic plate. As shown in FIG. 5, the swing yoke 50 is preferably provided in a symmetrical shape with respect to a centerline passing through the output shaft 20. The lower surface of the swing yoke 50 becomes a planar surface portion orthogonal to the output shaft 20. Two magnets 51 and 52 are preferably fixed to the planar surface portion in positions symmetrical with respect to the centerline. Each of the magnets 51 and 52 are magnetized in the direction parallel to the output shaft 20, preferably in the up-down direction. The magnetizing directions of the magnets 51 and 52 are opposite to each other. More specifically, as shown in FIG. 2, the lower magnetic pole of one magnet (the right magnet) 51 is preferably set as an N-pole and the lower magnetic pole of the other magnet (the left magnet) 52 is preferably set as an S-pole. The magnets 51 and 52 are juxtaposed so that the magnetic poles differing from each other can face the electromagnetic coil 40 through air gaps. The magnets 51 and 52 are arranged to face the upper surface of the major magnetic pole 41 and the upper end surfaces of the projection portions 31 and 32 in the magnetizing direction thereof. That is, each of the projection portions 31 and 32 stands face-to-face with outer edges of the magnets 51 and 52.

Figure 3:
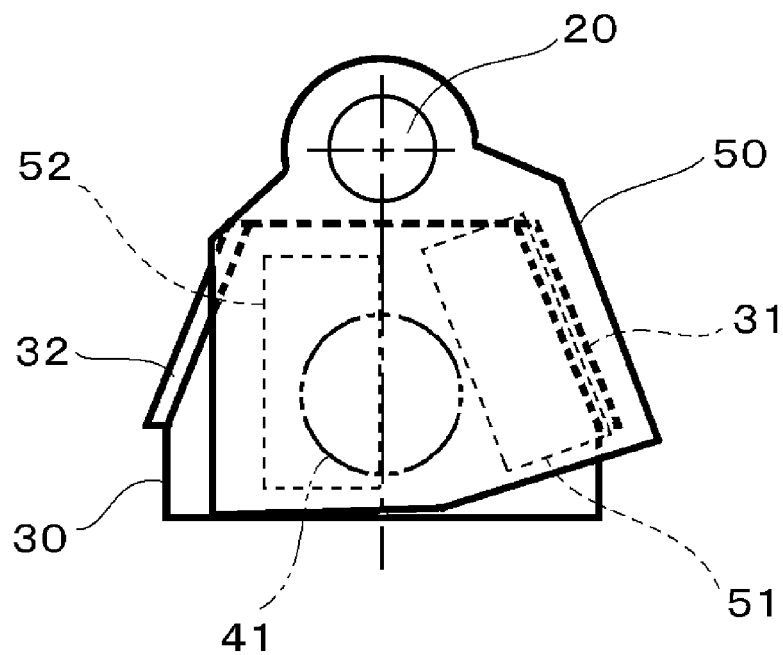
FIG. 3 is a plan view illustrating the relationship between a fixed yoke and a swing yoke of the rotary solenoid shown in FIG. 1.

Stoppers 14 and 15 facing the outer surfaces of the swing yoke 50 and restricting the swing range of the swing yoke 50 are preferably fixed to the left and right inner surfaces of the outer case unit 10. Assuming that the swing angle of the rotary solenoid is restricted to ±θ, the magnets 51 and 52 are arranged in the positions where the inner edges of the magnets 51 and 52 define an angle of ±θ with respect to the centerline passing through the center of the output shaft 20 as shown in FIG. 5. The projection portions 31 and 32 of the fixed yoke 30 extend in the front-rear direction to define an angle of about 2θ with respect to a straight line interconnecting the center of the output shaft 20 and the center of the major magnetic pole 41 as shown in FIG. 4. FIG. 3 shows the positional relationship between the magnets 51 and 52 and the projection portions 31 and 32 in the stop position of the swing yoke 50, preferably in the stop position where the swing yoke 50 makes contact with the right stopper 14. The inner edge of the left magnet 52 of the swing yoke 50 preferably coincides or substantially coincides with the center of the major magnetic pole 41 in the up-down direction. The outer edge of the right magnet 51 preferably coincides or substantially coincides with the transverse center of the end surface of the projection portion 31 in the up-down direction. This makes it possible to a maximum magnetic force. In the position where the swing yoke 50 makes contact with the left stopper 15, similarly, the inner edge of the right magnet 51 of the swing yoke 50 preferably coincides or substantially coincides with the center of the major magnetic pole 41 in the up-down direction. The outer edge of the left magnet 52 preferably coincides or substantially coincides with the transverse center of the end surface of the projection portion 32 in the up-down direction.

Figure 6A:
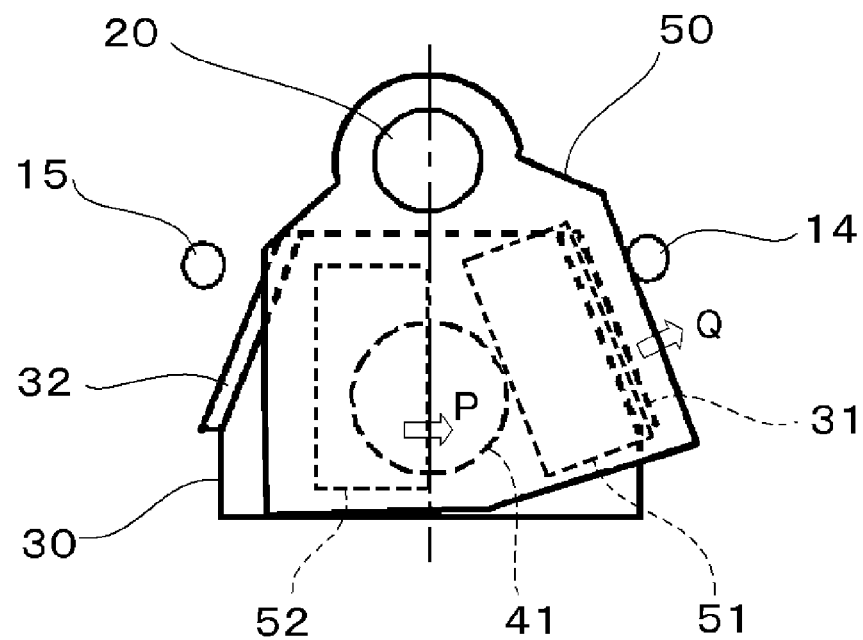
Figure 6B:
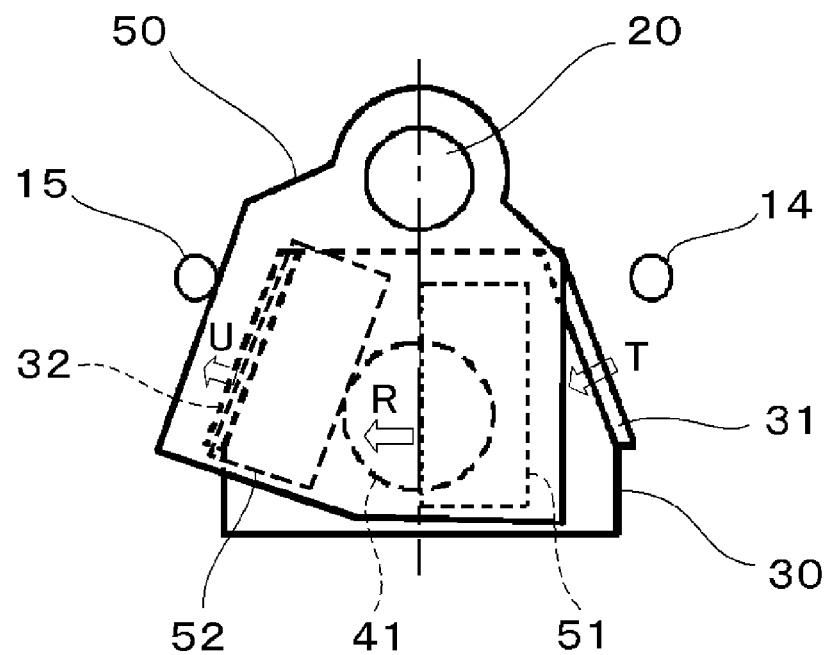

FIGS. 6A and 6B explain the operation of the rotary solenoid. FIG. 6A shows a de-energized state in which a magnetic attraction force P is generated between the left magnet 52 and the major magnetic pole 41. Moreover, a magnetic attraction force Q is generated between the right magnet 51 and the projection portion 31. Since the electromagnetic forces P and Q act in the same or substantially the same rotation direction, the swing yoke 50 is forcibly stopped by the stopper 14 in a state in which there remains an attraction force of P+Q.

FIG. 6B shows a state in which an electric current is supplied to the coil wire 43 of the electromagnetic coil 40. In this state, the electromagnetic coil 40 is excited and the major magnetic pole 41 is magnetized to have the same polarity (S-pole) as the left magnet 52 such that the swing yoke 50 is moved (swung) in the direction opposite to the aforementioned direction under the action of a large magnetic repulsion force R. In the meantime, the end surface of the projection portion 31 positioned substantially in line with the outer edge of the right magnet 51 is magnetized with a polarity (N-pole) opposite to the pole of the central portion of the electromagnetic coil 40. Thus, a magnetic repulsion force T is generated between the projection portion 31 and the right magnet 51. This makes it possible to obtain a large swing output force of R+T. Additionally, an attraction force U acts as the left magnet 52 comes closer to the end surface of the projection portion 32. These three electromagnetic forces R, T, and U are combined to swing the swing yoke 50 and are outputted as torque from the output shaft 20.

FIG. 2 shows a magnetic flux route in a self-holding state when the rotary solenoid is de-energized in the aforementioned movement position. Since the dedicated fixed yoke 30 is arranged in order to define a shortest magnetic circuit and the opposite ends of the fixed yoke 30 are bent upward to define the projection portions 31 and 32, there is provided a magnetic path in which the magnetic flux coming out from the N-pole of the right magnet 51 flow through the major magnetic pole 41 via a narrow space g1, go from the bottom surface of the fixed yoke 30 to the end surface of the projection portion 32, enter the S-pole of the left magnet 52 via a narrow space g2 and then come back to the magnet 51 through the swing yoke 50. Thus, it becomes possible to define a very short magnetic circuit having a reduced magnetic resistance. In this magnetic path, the magnetic flux vectors generated in the two spaces g1 and g2 are inclined in the same or substantially the same direction. The magnetic flux is equivalent to, for example, the properties of rubber, tending to shrink or return to a shortest possible distance. Due to the inclination of the magnetic flux shown in FIG. 2, the swing yoke 50 carrying the magnets 51 and 52 is self-held by the stopper 15 in a state that a stress acting to the left is left as indicated by a thick arrow in FIG. 2.

The positional relationship between the inner edge of the magnet 51 (or 52) and the center of the major magnetic pole 41 facing each other across an air gap and the positional relationship between the outer edge of the magnet 52 (or 51) and the end surface of the projection portion 32 (or 31) facing each other across an air gap are important in increasing the inclination of the magnetic flux. The result of analysis of electromagnetic fields reveals that, if the side edge of a magnet is positioned to cover one half of the end surface of a magnetic body facing the magnet, the inclined magnetic flux become largest and the magnetic attraction/repulsion forces become largest.

By changing the direction of the electric current supplied to the electromagnetic coil 40 in a timely manner, it is possible to swing the magnets 51, 52 and the swing yoke 50 so as to obtain rotation torque from the output shaft 20.

Second Preferred Embodiment

Next, a rotary solenoid according to another preferred embodiment of the present invention will be described with reference to FIGS. 7 through 9.

In this preferred embodiment, the outer peripheral edges of a pair of magnets fixed to the swing yoke and the opposite projection portions of the fixed yoke are preferably arranged into an arc shape, thus increasing the area over which the peripheral edge of each of the magnets face the end surface of each of the projection portions and increasing the magnetic force in two stop positions corresponding to the operation swing angle of $\pm\theta$.

Figure 8:
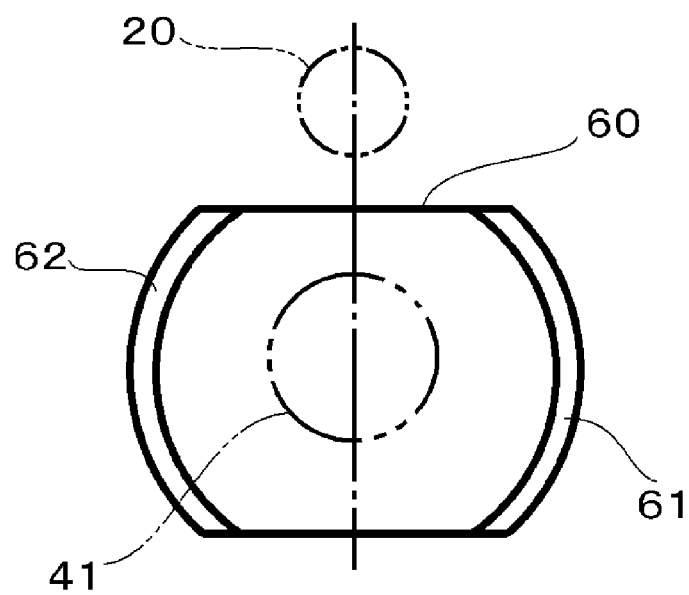
FIG. 8 is a plan view of the fixed yoke shown in FIG. 7.
Figure 9:
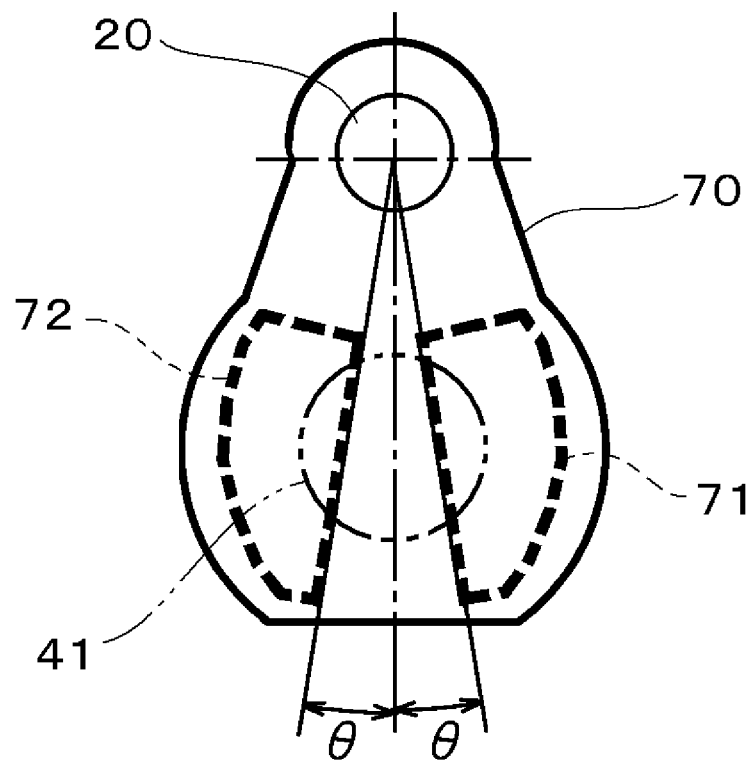
FIG. 9 is a plan view of the swing yoke shown in FIG. 7.

In other words, as shown in FIG. 8, the fixed yoke 60 supporting the electromagnetic coil is arranged into an oval or substantially oval shape through a magnetic plate. The major magnetic pole 41 of the electromagnetic coil is magnetically coupled to the central portion of the fixed yoke 60. Projection portions 61 and 62 having an arc shape when seen in a plan view are preferably arranged in the left and right portions of the fixed yoke 60 by, for example, bending a magnetic plate upward. The height of the projection portions 61 and 62 is preferably set to be equal or substantially equal to the height of the major magnetic pole 41. On the other hand, as shown in FIG. 9, the swing yoke 70 fixed to the output shaft 20 in a perpendicular or substantially perpendicular relationship therewith is preferably has a substantially gourd-shaped configuration including a magnetic plate so as to be symmetrical with respect to the centerline passing through the center of the output shaft 20. Thus, the lower surface of the swing yoke 70 is preferably a planar surface portion to which two magnets 71 and 72 are attached. Each of the magnets 71 and 72 are magnetized in the direction parallel to the axial direction of the output shaft 20. The magnets 71 and 72 are juxtaposed so that the magnetic poles differing from each other face the electromagnetic coil. The mutually adjoining inner edges of the magnets 71 and 72 are provided in a rectilinear shape and are arranged at an angle of $\pm\theta$ with respect to the centerline. The outer edge of each of the magnets 71 and 72 is preferably arranged into an arc shape. The arc of each of the magnets 71 and 72 has the same or substantially the same shape as the projection portions 61 and 62 of the fixed yoke 60.

Figure 7:
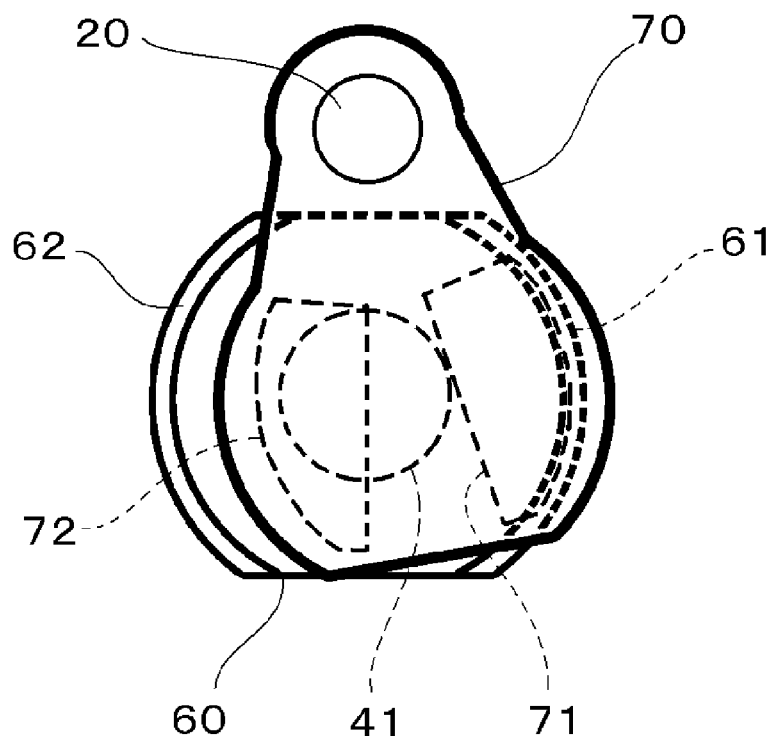
FIG. 7 is a plan view illustrating the relationship between a fixed yoke and a swing yoke of a rotary solenoid according to another preferred embodiment of the present invention.

FIG. 7 shows a state in which the swing yoke 70 is swung to the rightmost end of the swing range. As in the preferred embodiment described in respect of FIGS. 1 through 6, the swing range of the swing yoke 70 is preferably restricted by a pair of stoppers. In FIG. 7, the swing yoke 70 is kept in a fixed position by making contact with the right stopper. At this time, the inner edge of the left magnet 72 of the swing yoke 70 preferably coincides or substantially coincides with the center of the major magnetic pole 41. The arc-shaped outer edge of the right magnet 71 preferably coincides or substantially coincides with the end surface of the right arc-shaped projection portion 61 of the fixed yoke 60. On the contrary, when the swing yoke 70 contacts the left stopper and remains stationary, the inner edge of the right magnet 71 preferably coincides or substantially coincides with the center of the major magnetic pole 41. The arc-shaped outer edge of the left magnet 72 preferably coincides or substantially coincides with the end surface of the left arc-shaped projection portion 62.

Since the magnets 71 and 72 of the swing yoke 70 are arranged in such a positional relationship with the major magnetic pole 41 of the electromagnetic coil and the projection portions 61 and 62 of the fixed yoke 60, a force holding the swing yoke 70 in position is secured as in the case in the foregoing preferred embodiment. Particularly, in the present preferred embodiment, the outer edges of the magnets 71 and 72 and the projection portions 61 and 62 are preferably arranged into a mutually-conforming arc shape. It is therefore possible to increase the area over which the outer edges of the magnets face the end surfaces of the projection portions and to reduce the magnetic flux leaked in the rotary solenoid. As a result, it is possible to significantly increase the utilization efficiency of the magnetic flux generated by the magnets. This makes it possible to obtain a large magnetic force and to increase the output power.

Figure 10:
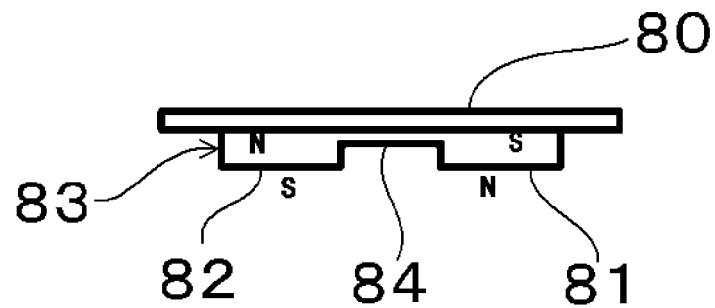
FIG. 10 is a front view showing a modified example of the magnet of the rotary solenoid according to a preferred embodiment of the present invention.

Next, FIG. 10 shows one modified example of the magnets in accordance with a preferred embodiment of the present invention. Two magnets 81 and 82 fixed to the planar surface portion of the swing yoke 80 are preferably provided by a neodymium-based bond magnet material. In a molded article 83 of the magnets 81 and 82, a thin non-magnetized portion 84 is preferably provided in a region between the magnets 81 and 82. The magnets 81 and 82 are magnetized with two poles.

If the magnets 81 and 82 are defined by the magnet molded body 83 in this manner, it is possible to reduce the material cost of the magnets by one half. Additionally, the degree of freedom with respect to the shape of the magnets is significantly increased. It is also possible to significantly improve the ease and efficiency of the task of attaching to magnets to the swing yoke 80. As compared with a sintered magnet, it is possible to reduce the specific gravity of the magnets by about 20%, for example. This helps reduce the inertial moment of the swing unit and increase the operation speed of the output shaft.

Third Preferred Embodiment

Next, a rotary solenoid according to a further preferred embodiment of the present invention will be described with reference to FIGS. 11 through 16.

Figure 11:
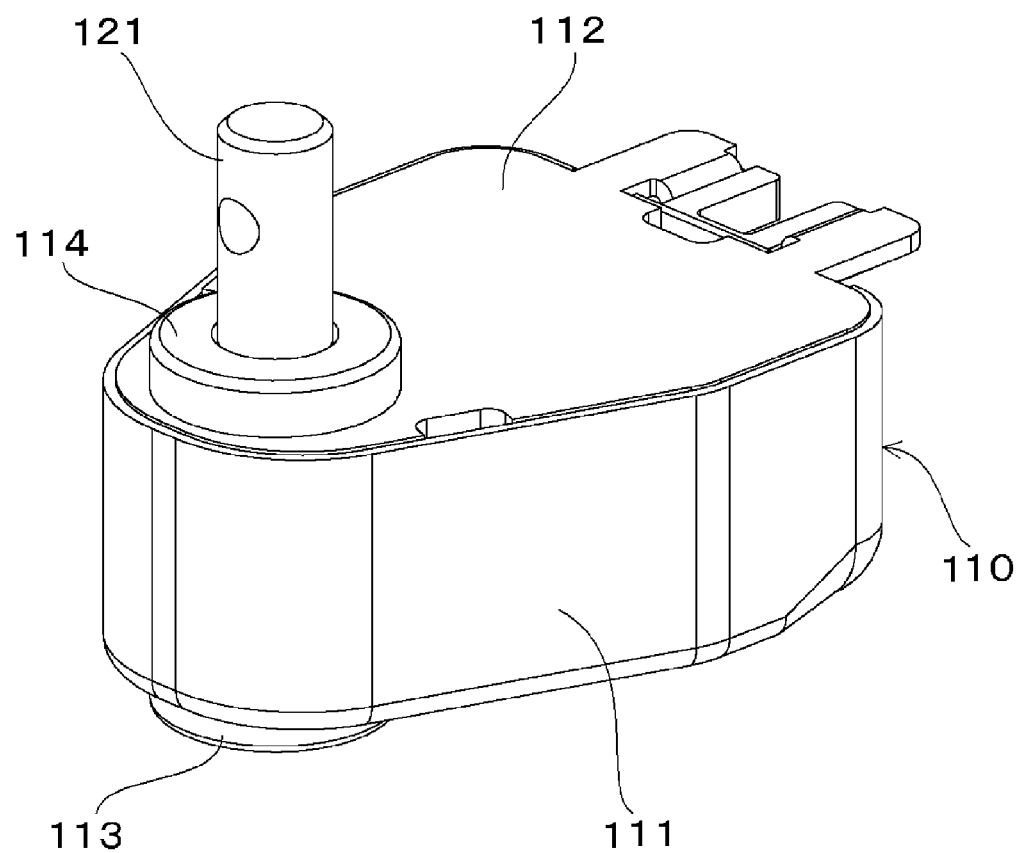
FIG. 11 is a perspective view showing a rotary solenoid according to a further preferred embodiment of the present invention.
Figure 12:
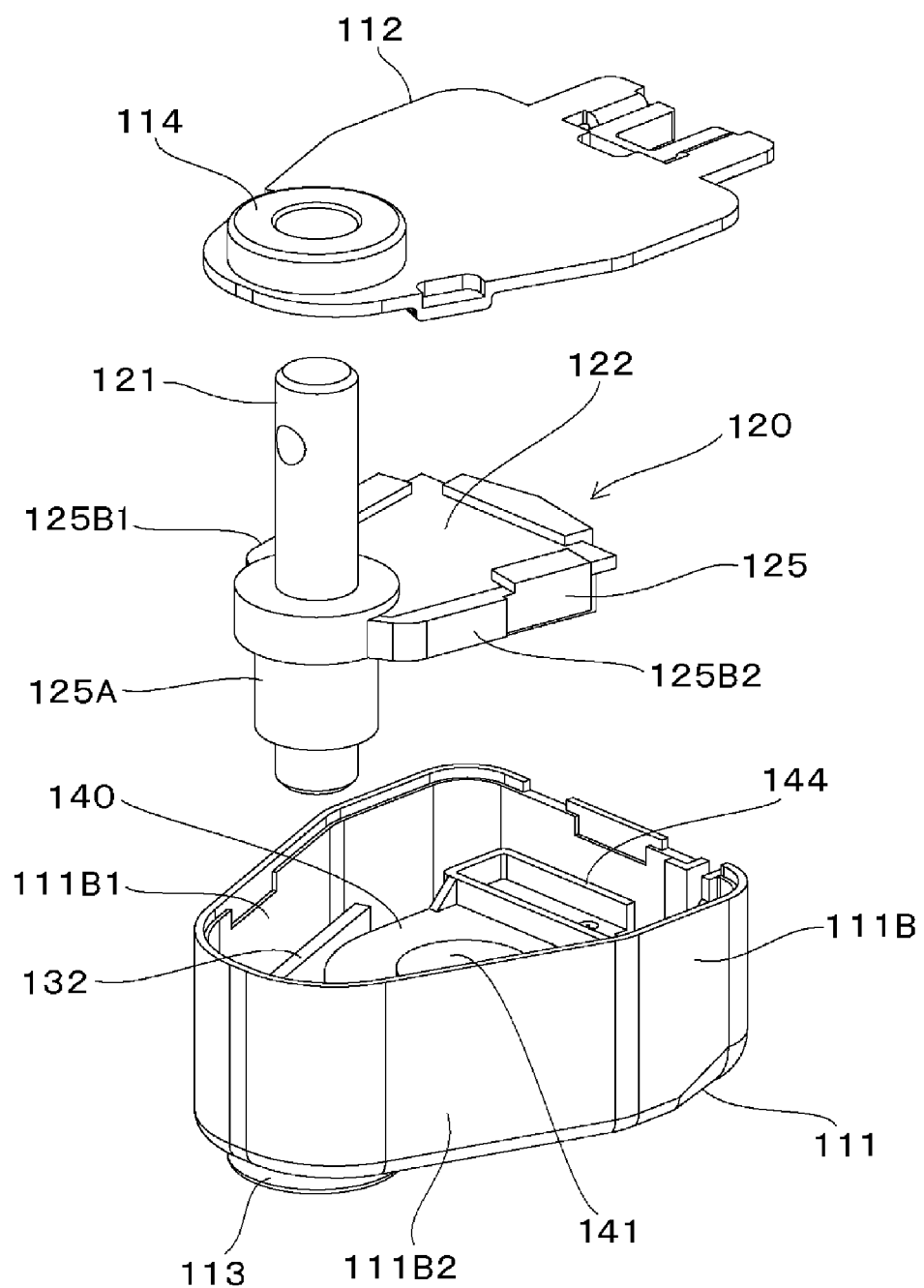
FIG. 12 is an exploded perspective view of the rotary solenoid shown in FIG. 11.

FIG. 11 shows the external shape of the rotary solenoid. FIG. 12 shows a state that the rotary solenoid shown in FIG. 11 is exploded into individual components. In this rotary solenoid, an output shaft 121 protruding beyond the upper surface of a box-shaped outer case unit 110 is repeatedly swung at an angle of ±θ (namely, 2θ). The outer case unit 110 preferably includes a body case 111 including an opening arranged in the upper surface thereof and a cover case 112 arranged to cover the opening of the body case 111. The outer case unit 110 is preferably made of, e.g., a metallic material. The outer case unit 110 preferably has a substantially home-base shape (e.g., a pentagon shape) when seen in a plan view. Bearing portions 113 and 114 defined by slide bearings are preferably inserted through and attached to the regions of the body case 111 and the cover case 112 through which the output shaft 121 extends, preferably in the tapering end regions of the bottom plate 111A of the body case 111 and the cover case 112. The bearing portions 113 and 114 are configured to rotatably support the output shaft 121. The upper portion of the output shaft 121 protrudes outward from the bearing portion 114 of the cover case 112.

Figure 13:
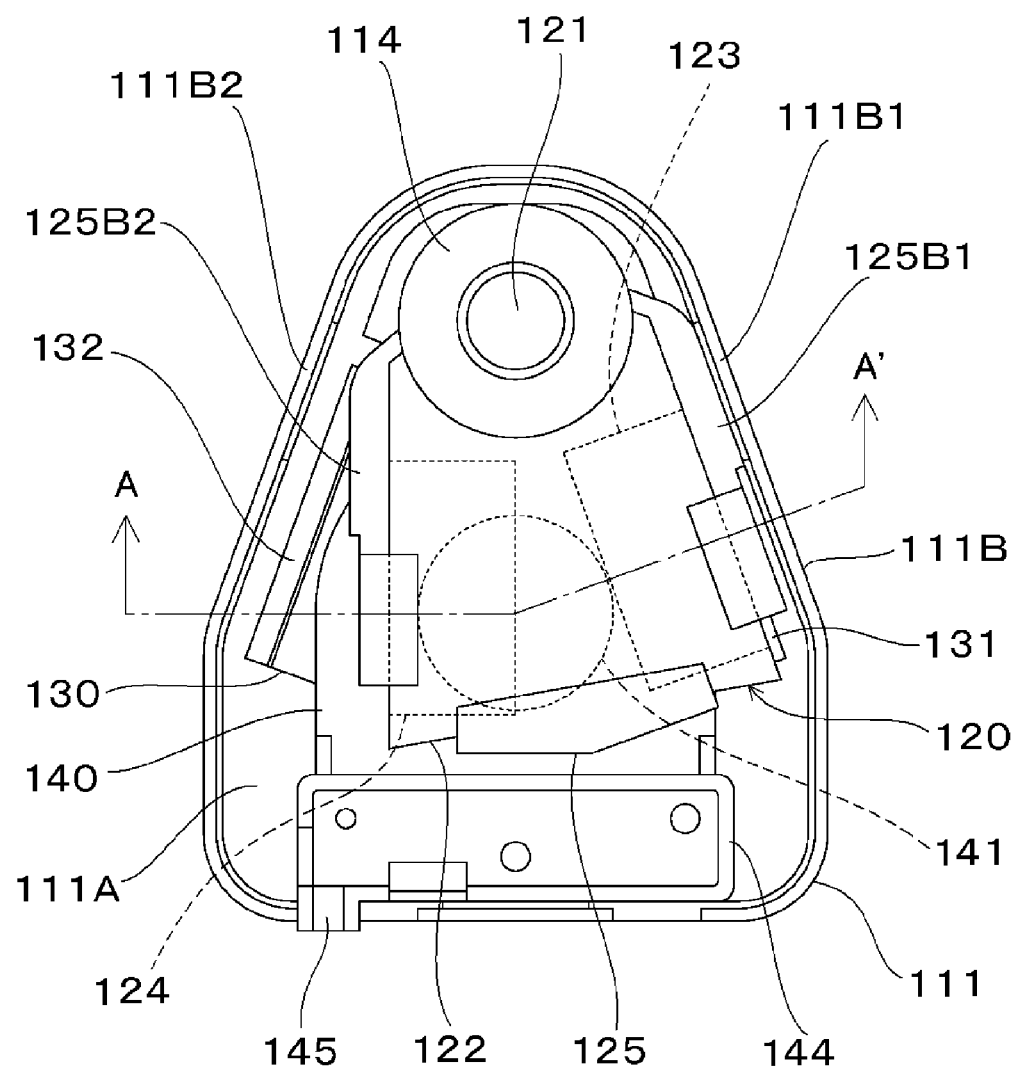
FIG. 13 is a plan view of the rotary solenoid shown in FIG. 11, with a top cover removed for clarity.
Figure 14:
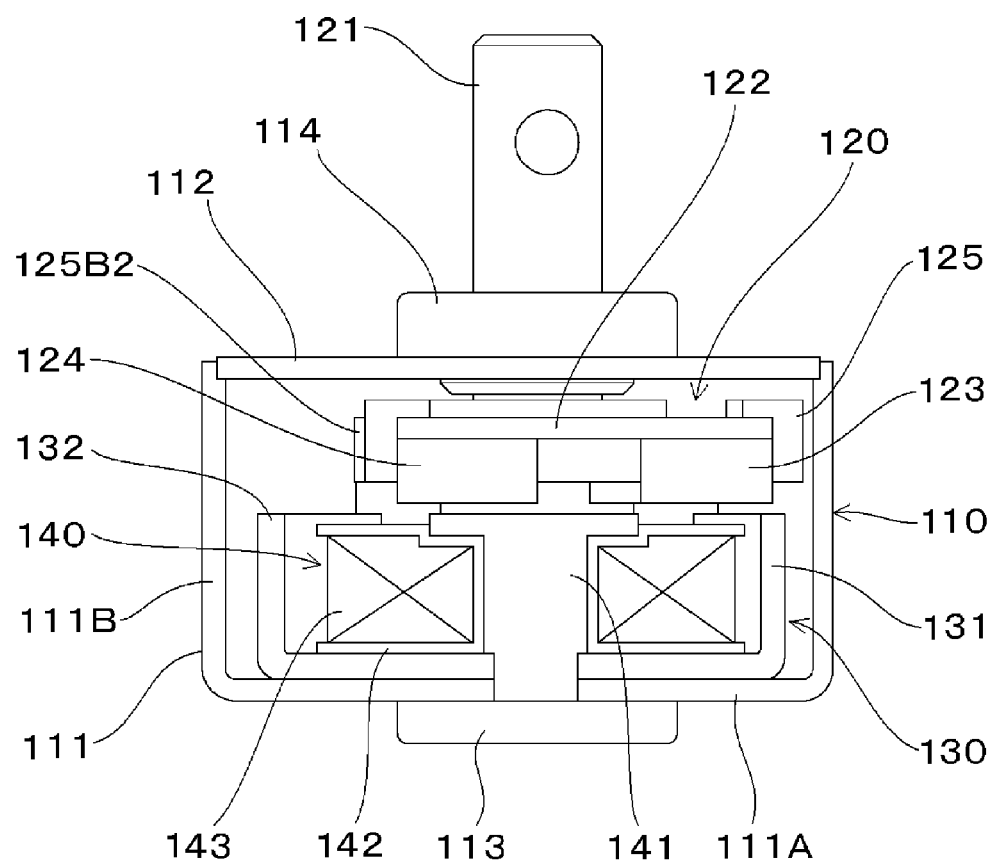
FIG. 14 is a front sectional view taken along line A-A' in FIG. 13.

FIGS. 13 and 14 show the internal structure of the body case 111. A fixed yoke 130 made of a magnetic material is preferably attached to the upper surface of the substantially central portion of the bottom plate 111A of the body case 111. An electromagnetic coil 140 is fixed to the central portion of the fixed yoke 130. The electromagnetic coil 140 includes a major magnetic pole 141 arranged at the center of the electromagnetic coil 140 and made of a magnetic material. The electromagnetic coil 140 is preferably defined by winding a coil wire 143 around the major magnetic pole 141 through a coil bobbin 142. The lower end portion of the major magnetic pole 141 is fixed to and magnetically coupled with the fixed yoke 130. The fixed yoke 130 preferably has a symmetrical polygonal shape. Projection portions 131 and 132 positioned at the opposite sides of the outer periphery of the electromagnetic coil 140 and bent upward by, for example, a bending work in a parallel or substantially parallel relationship with the axis of the output shaft 121 are preferably provided in the left and right portions of the fixed yoke 130. The projection portions 131 and 132 are arranged so that the tip end surfaces thereof have the same or substantially the same height as the major magnetic pole 141 of the electromagnetic coil 140. In this regard, the fixed yoke 130 having a symmetrical polygonal shape preferably has a symmetry line arranged in a position passing through the center of the output shaft 121. Each of the projection portions 131 and 132 is inclined by an angle of 2θ with respect to the centerline of the fixed yoke 130 and is arranged in parallel or substantially parallel to the side wall portions 111B1 and 111B2 of the peripheral wall 111B of the body case 111 corresponding to the tapering slant position of the home base shape.

Figure 15:
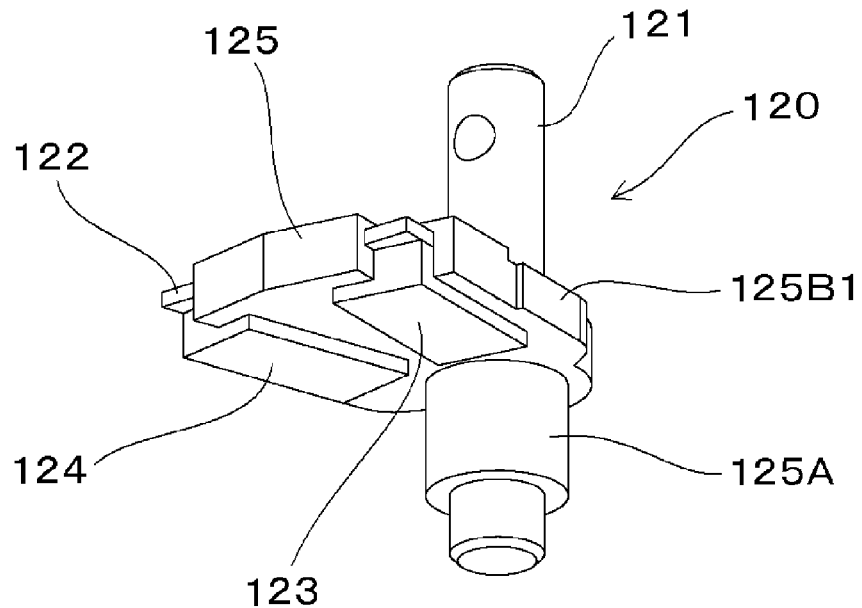
FIG. 15 is a bottom perspective view of a swing rotor of the rotary solenoid shown in FIG. 11.
Figure 16:
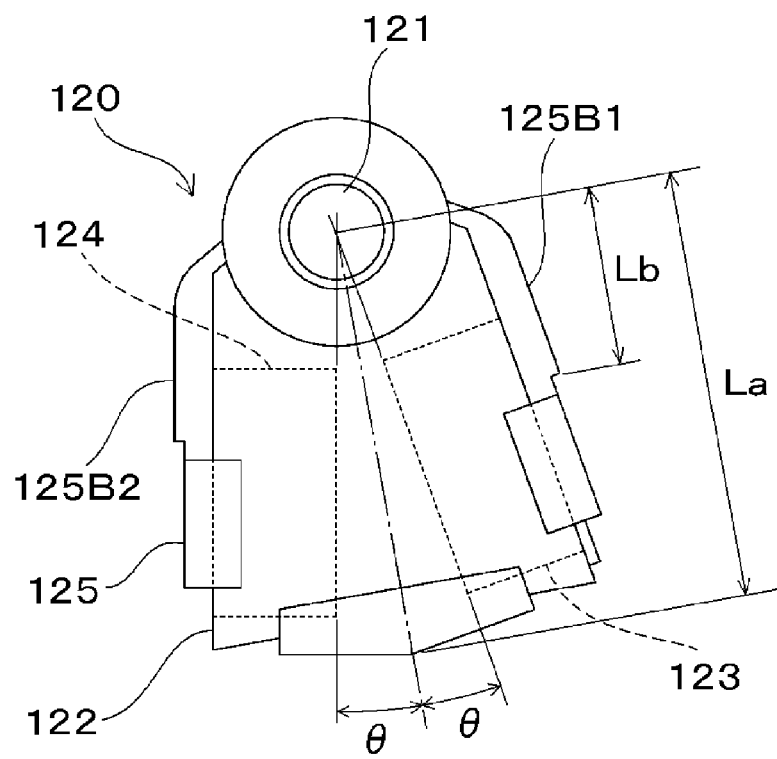
FIG. 16 is a plan view of the swing rotor of the rotary solenoid shown in FIG. 11.
Figure 17:
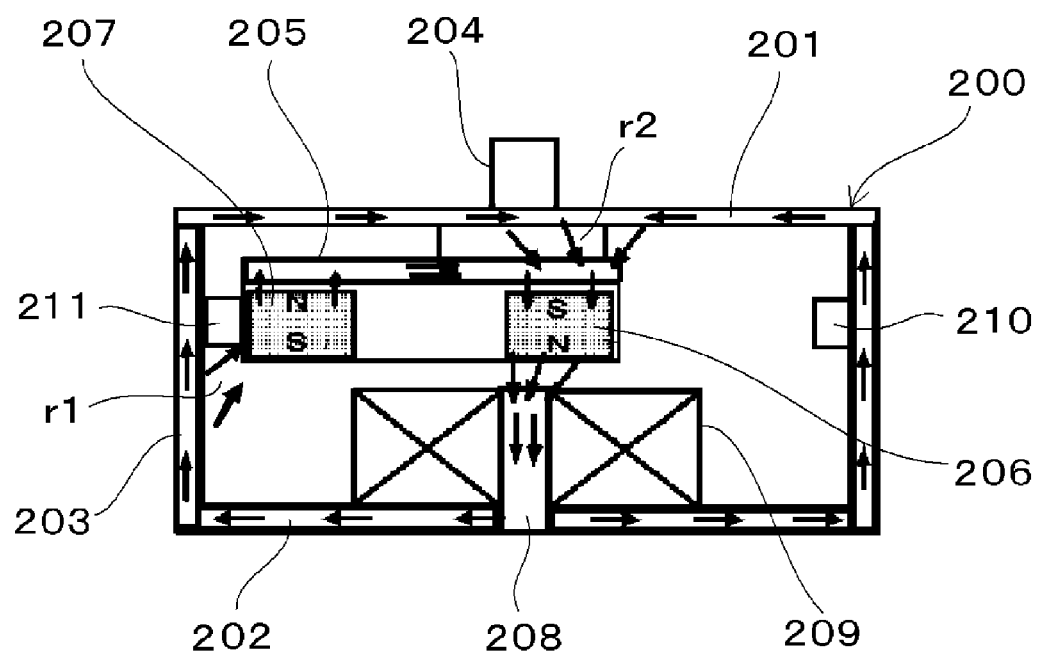
FIG. 17 is a front section view explaining a magnetic path provided in a conventional rotary solenoid.

A swing rotor 120 provided with the output shaft 121 is accommodated within the outer case unit 110 with a portion of the output shaft 121 protruding outward. As shown in FIGS. 12, 15, and 16, the swing rotor 120 preferably includes a swing yoke 122 defined by a magnetic metal plate including a planar surface portion (rear surface portion) orthogonal to the axial direction of the output shaft 121, two rectangular magnets 123 and 124 arranged on the planar surface portion of the swing yoke 122, and a holder 125 made of a non-magnetic resin material arranged to unify the output shaft 121, the swing yoke 122 and the magnets 123 and 124 by way of, for example, insert molding. The lower end portion and the intermediate portion of the output shaft 121 of the swing rotor 120 are rotatably supported by the bearing portions 113 and 114. The magnets 123 and 124 of the planar surface portion of the swing yoke 122 are axially opposed to the upper end surface of the major magnetic pole 141 of the electromagnetic coil 140 across a specified air gap.

As shown in FIG. 16, the swing yoke 122 preferably has a symmetrical shape with respect to the centerline passing through the center of the output shaft 121. The output shaft 121 is preferably, for example, press-fitted to the shaft hole defined in one end portion of the swing yoke 122. The magnets 123 and 124 attached to the rear surface portion of the swing yoke 122 are arranged in the positions symmetrical with respect to the centerline, preferably in the positions where the mutually-facing lateral edges (inner edges) of the magnets 123 and 124 make an angle of θ with respect to the centerline. Each of the magnets 123 and 124 is magnetized in the direction parallel to the output shaft 121, preferably in the up-down direction. The magnetizing directions of the magnets 123 and 124 are set to become opposite to each other. The magnets 123 and 124 are juxtaposed so that the magnetic poles differing from each other can face the electromagnetic coil 140 across air gaps. The magnets 123 and 124 are opposed to the upper surface of the major magnetic pole 141 and the upper end surfaces of the projection portions 131 and 132 in the up-down direction.

The insert molding of the swing rotor 120 is preferably performed in a state that the output shaft 121 is press-fitted to the shaft hole of the swing yoke 122 and further that the magnets 123 and 124 are arranged in specified positions with respect to the swing yoke 122. In other words, the holder 125 is molded by arranging the combination of the swing yoke 122 and the output shaft 121 and the magnets 123 and 124 within a mold and injecting a resin material into the mold. In this case, the magnets 123 and 124 are used in a non-magnetized state. The positions of the magnets 123 and 124 with respect to the swing yoke 122 is defined by the mold. The holder 125 molded in this manner preferably covers the outer periphery of the swing yoke 122 and the outer periphery of the lower half portion of the output shaft 121. The holder 125 covers the rear surface portion of the swing yoke 122 so as to expose the end surfaces of the magnets 123 and 124. The holder 125 strongly combines the swing yoke 122 and the output shaft 121 while keeping the swing yoke 122 perpendicular or substantially perpendicular to the output shaft 121. The holder 125 strongly fixes the magnets 123 and 124 to the swing yoke 122. At this time, the magnets 123 and 124 are fixed so as to make contact with the rear surface portion of the swing yoke 122. In the swing rotor 120 thus formed, magnetization is carried out with respect to the magnets 123 and 124 through the use of a dedicated magnetizer. Alternatively, the magnets 123 and 124 may be magnetized in advance if so desired. The magnets 123 and 124 may be attracted to the swing yoke 122 in specified positions and in a specified magnetic pole direction. Insert molding may be performed in this state.

A cylindrical boss portion 125A covering the outer periphery of the lower portion of the output shaft 121 preferably is one-piece integrally formed with the holder 125 of the swing rotor 120. The axial dimension of the boss portion 125A is preferably set to ensure that the swing yoke 122 has a specified height when the swing rotor 120 is installed within the outer case unit 110. In other words, the axial dimension of the boss portion 125A is set such that, when the lower end portion of the output shaft 121 is mounted to the bearing portion 113, the lower end surface of the boss portion 125A makes contact with the upper surface of the bearing portion 113 while the lower surfaces of the magnets 123 and 124 fixed to the swing yoke 122 face the upper surface of the major magnetic pole 141 of the electromagnetic coil 140 across a specified air gap. While not shown in the drawings, a knurling work is preferably performed on the outer circumferential surface of the portion of the output shaft 121 fitted to the swing yoke 122 so as to increase the fixing strength of the swing yoke 122 and the output shaft 121. In addition, the knurling work is preferably performed even on the portion of the output shaft 121 corresponding to the boss portion 125A. Thus, the insertion molded holder 125 is preferably fixed to the output shaft 121 with an increased fixing strength.

Contact portions 125B1 and 125B2 are preferably provided near the central portions of the holder 125 of the swing rotor 120 at the swing direction opposite sides in such a fashion so as to bulge slightly outward. When the swing rotor 120 is swung, the contact portions 125B1 and 125B2 come into contact with the inner surfaces of the side wall portions 111B1 and 111B2 of the peripheral wall 111B of the body case 111 so as to restrict the swing range of the swing rotor 120. The side wall portions 111B1 and 111B2 of the peripheral wall 111B of the body case 111 serve as stoppers of the swing rotor 120. The configuration can be simplified by using the body case 111 as stoppers. As shown in FIG. 16, the contact portions 125B1 and 125B2 of the holder 125 are preferably arranged in positions such that, when the distance from the center of the output shaft 121 to the radial outer end of the swing rotor 120 is assumed to be La, the distance Lb from the center of the output shaft 121 to the radial outer ends of the contact portions 125B1 and 125B2 becomes equal to or smaller than one half of La (La/2≥Lb).

As shown in FIGS. 12 and 13, a part accommodation portion 144 which is preferably provided together with the coil bobbin 142 of the electromagnetic coil 140 as a single monolithic member is arranged at the opposite side (the other end side) of the outer case unit 110 from the output shaft 121. For example, a temperature fuse and so forth are preferably accommodated within the part accommodation portion 144. The terminal of the coil wire 143 of the electromagnetic coil 140 is connected to an externally-leading lead wire via the temperature fuse. The lead wire extends outward from a lead-out hole 145 defined in the part accommodation portion 144.

In the rotary solenoid of this configuration, the swing rotor 120 is repeatedly swung by controlling the supply of an electric current to the electromagnetic coil 140. This makes it possible to obtain a repetitive rotation force from the output shaft 121. More specifically, FIGS. 13 and 14 show the positional relationship between the magnets 123 and 124 and the major magnetic pole 141 in the stop position of the swing rotor 120, preferably in the stop position where the right contact portion 125B1 of the holder 125 makes contact with the side wall portion 111B1 serving as a case-side stopper. The inner edge of the left magnet 124 of the swing yoke 122 preferably coincides or substantially coincides with the center of the major magnetic pole 141 in the up-down direction. The outer edge of the right magnet 123 preferably coincides or substantially coincides with the end surface of the projection portion 131 in the up-down direction. This makes it possible to obtain a maximum magnetic force.

Referring to FIGS. 13 and 14, in a de-energized state, a magnetic attraction force is preferably generated between the left magnet 124 and the major magnetic pole 141. Moreover, a magnetic attraction force is generated between the right magnet 123 and the projection portion 131. Since these magnetic forces act in the same or substantially the same rotational direction (i.e., counterclockwise when seen in a plan view), the contact portion 125B1 of the holder 125 makes contact with the side wall portion 111B1 and stops in a state that the attraction forces remain active. At this time, a magnetic circuit extending through the left magnet 124 is provided, the major magnetic pole 141, the fixed yoke 130, the projection portion 131, the right magnet 123 and the swing yoke 122.

If an electric current is supplied to the coil wire 143 of the electromagnetic coil 140 in this state, the electromagnetic coil 140 is excited and the major magnetic pole 141 is magnetized with the same polarity as the magnetic pole of the lower portion of the left magnet 124. A large magnetic repulsion force acts between the left magnet 124 and the major magnetic pole 141. The swing rotor 120 is moved (swung) clockwise. On the other hand, the projection portion 131 positioned substantially in line with the outer edge of the right magnet 123 is magnetized with a polarity opposite to the magnetic pole of the central portion of the electromagnetic coil 140. Thus, a magnetic repulsion force is generated between the projection portion 131 and the right magnet 123 such that a large swing output power can be obtained using these forces. In addition, a magnetic attraction force acts as the left magnet 124 comes closer to the end surface of the projection portion 132. These three electromagnetic forces are combined together and are outputted as torque from the output shaft 121. The swing rotor 120 stops its swing motion in the position where the contact portion 125B2 of the holder 125 makes contact with the side wall portion 111B2. The swing rotor 120 is kept stopped in this position. Thus, in this state, contrary to the above description, the inner edge of the right magnet 123 of the swing yoke 122 preferably coincides or substantially coincides with the center of the major magnetic pole 141 in the up-down direction. The outer edge of the left magnet 124 preferably coincides or substantially coincides with the end surface of the projection portion 132 in the up-down direction.

If a de-energized state is established in this swing position, a magnetic attraction force is generated between the right magnet 123 and the major magnetic pole 141. Moreover, a magnetic attraction force is generated between the left magnet 124 and the projection portion 132. Since these magnetic forces act in the same or substantially the same rotational direction (i.e., clockwise), the contact portion 125B2 of the holder 125 is kept in contact with the side wall portion 111B2 in a state that the attraction forces remain active. At this time, a magnetic circuit extending through the right magnet 123 is defined, the major magnetic pole 141, the fixed yoke 130, the projection portion 132, the left magnet 124 and the swing yoke 122. This establishes a self-holding state.

Next, if an electric current is supplied to the electromagnetic coil 140 in a direction opposite to the aforementioned direction, the electromagnetic coil 140 is excited in the reverse direction and the major magnetic pole 141 is magnetized with the same polarity as the magnetic pole of the lower portion of the right magnet 123. A large magnetic repulsion force is preferably generated between the magnet 123 and the major magnetic pole 141. The swing rotor 120 is moved (swung) counterclockwise. At the same time, the projection portion 132 positioned substantially in line with the outer edge of the left magnet 124 is magnetized with a polarity opposite to the magnetic pole of the central portion of the electromagnetic coil 140. Thus, a magnetic repulsion force is generated between the projection portion 132 and the left magnet 124 such that a large swing output power can be obtained using these forces. In addition, a magnetic attraction force acts as the right magnet 123 comes closer to the end surface of the projection portion 131. These three electromagnetic forces are combined together and are outputted as torque from the output shaft 121. The swing rotor 120 stops its swing motion in the position where the contact portion 125B1 of the holder 125 makes contact with the side wall portion 111B1. The swing rotor 120 is kept in the state shown in FIGS. 13 and 14. If the direction of supply of an electric current to the electromagnetic coil 140 is switched in this manner, the swing rotor 120 repeats its swing operation. This makes it possible to obtain specified output power.

In the preferred embodiment described above, there is preferably provided a dedicated fixed yoke 130 that defines a shortest magnetic circuit during the reciprocating operation of the swing rotor 120 and during the de-energized self-holding time. The opposite ends of the fixed yoke 130 are bent upward to define the projection portions 131 and 132 which face the magnets 123 and 124 across narrow air gaps. It is therefore possible to define a magnetic circuit including a very short magnetic path and a reduced magnetic resistance. As a result, even if ferrite-based magnets having a low grade (e.g., a low residual magnetic flux density or the like) are used as the magnets 123 and 124, it is possible to secure a desired operation and to significantly reduce the cost. In the aforementioned preferred embodiment, the body case 111 and the cover case 112 both of which define the outer case unit 110 are preferably made of a metallic material. However, there is no problem in the magnetic characteristic because a magnetic circuit concentrating at a shortest distance is provided by the fixed yoke 130 within the outer case unit 110. This is particularly desirable under an environment where a shield function is required with respect to weak magnetic fields.

In the rotary solenoid of this kind, there is a demand for quick responsiveness with a shortened operation time. This responsiveness varies depending on the positions of the magnets 123 and 124 arranged in the swing yoke 122 and the positional relationship between the swing yoke 122 and the electromagnetic coil 140. For that reason, the positional relationship between the swing yoke 122 and the electromagnetic coil 140 and the arrangement positions of the magnets 123 and 124 in the swing yoke 122 are important in securing desired performance.

In the aforementioned preferred embodiment, the swing rotor 120, the output shaft 121, the swing yoke 122 and the magnets 123 and 124 preferably are all unified by, for example, insert molding. Therefore, it becomes easy to perform an assembling work. It is also possible to easily secure the positional accuracy of the magnets 123 and 124 in the swing yoke 122. This helps increase the assembling accuracy. Accordingly, it becomes possible to enhance the performance of the rotary solenoid, to increase the productivity and mass-productiveness and to reduce the price of the rotary solenoid.

The holder 125 preferably formed by, for example, insert molding is one-piece molded with the boss portion 125A capable of defining the height positions of the magnets 123 and 124 in the body case 111 and capable of causing the lower surfaces of the magnets 123 and 124 to face the upper surface of the major magnetic pole 141 of the electromagnetic coil 140 across specified gaps. Accordingly, it is possible to secure the magnetic accuracy by merely inserting the swing rotor 120 into the body case 111. This makes it possible to simplify the assembling work and to enhance the performance of the rotary solenoid.

In addition, the contact portions 125B1 and 125B2 positioned at the opposite sides of the swing yoke 122 are preferably defined in the resin-made holder 125 of the swing rotor 120. The swing motion of the swing rotor 120 is restricted by bringing the contact portions 125B1 and 125B2 into contact with the stoppers (the side wall portions 111B1 and 111B2) of the body case 111. Therefore, as compared with a case where a metal-made swing yoke is brought into direct contact with a stopper, it is possible to reduce vibrations and noises which may be generated during collision. Moreover, the contact portions 125B1 and 125B2 are preferably arranged nearer to the center than one half of the distance La from the center of the output shaft 121 to the radial outer end of the swing rotor 120. Therefore, as compared with a case where the contact portions are provided near the radial outer end of the swing rotor 120, it is possible to minimize the collision energy generated by the collision of the swing rotor 120 with the body case 111. This makes it possible to reduce vibrations and noises.

While the rotary solenoids according to the preferred embodiments of the present invention have been described above, the present invention is not limited thereto but may be changed or modified in many different forms without departing from the scope and sprit of the present invention.

For example, in the self-holding state in which the electromagnetic coil remains de-energized, a portion of each of the magnets may just overlap with the major magnetic pole in the up-down direction, instead of the inner edge of each of the magnets fixed to the swing yoke coinciding with the center of the major magnetic pole of the electromagnetic coil. That is, a magnetic attraction force is generated and a holding force can be obtained only if each of the magnets comes close to the major magnetic pole in a state that the magnetic center of each of the magnets is out of alignment from the center of the major magnetic pole. Instead of the outer edge of each of the magnets coinciding with the center of the end surface of each of the projection portions of the fixed yoke, the outer edge each of the magnets may partially or fully overlap with the end surface of each of the projection portions or may not overlap with the end surface of each of the projection portions at all. In either case, it is possible to obtain a large enough magnetic attraction force.

The preferred embodiments described above preferably are directed to a case where the outer case unit arranged to accommodate the fixed yoke, the electromagnetic coil, the swing yoke and the like is provided by a resin-molded body and a case where the outer case unit is made of a metallic magnetic material. Since a magnetic circuit providing a shortest distance is defined within the outer case unit, the magnetic flux leaked to the outside does not matter. In a case where the outer case unit is defined by a resin-molded body, it is possible to cope with an environment under which a magnetic shield function is required with respect to weak magnetic flux, by mixing magnetic components into the material of the resin-molded body or by merely providing a shield layer on the outer periphery of the resin-molded body.

In a case where the outer case unit is made of a metallic material, the shock generated when the swing rotor comes into contact with the stoppers can preferably be mitigated by providing shock-absorbing materials on the inner surfaces of the side wall portions of the peripheral wall of the body case (particularly, in the positions corresponding to the contact portions of the swing rotor).

In the preferred embodiment described in respect of FIGS. 11 through 16, the contact portions 125B1 and 125B2 of the holder 125 of the swing rotor 120 are preferably arranged within the distance Lb shorter than one half of the distance La from the center of the output shaft 121 to the radial outer end of the swing rotor 120. However, the contact portions 125B1 and 125B2 need not be necessarily arranged within one half of the distance La. The advantageous effects described above can be obtained as long as center positions of the contact portions 125B1 and 125B2 are positioned nearer to the center than one half of the distance La from the center of the output shaft 121 to the radial outer end of the swing rotor 120.

The preferred embodiments of the present invention can be used in an application where there is a demand to repeatedly swing an output shaft within a specified angular range and to generate a self-holding force. Since the arrangement of the magnets and the shape of the fixed yoke can be set in view of the swing angle, it is possible to readily provide a magnetic circuit including a short magnetic path. As a result, it is possible to provide a rotary solenoid having special features such as, for example, material cost savings, part number reduction, and inertial moment reduction. The rotary solenoid according to various preferred embodiments of the present invention can be widely used as a drive power source for industrial machines, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotary solenoid, comprising:
    an electromagnetic coil including a major magnetic pole arranged at a center thereof;
    two axially-magnetized magnets;
    a swing yoke including a planar surface portion to which the magnets are fixed in a juxtaposed state such that magnetic poles differing from each other face the electromagnetic coil across air gaps; and
    an output shaft arranged in a perpendicular relationship with the planar surface portion and in a parallel relationship with the major magnetic pole so as to rotatably support the swing yoke, the swing yoke being arranged to be swung in forward and reverse directions at a specified angle $\theta$ with respect to a centerline interconnecting a center of the output shaft and a center of the major magnetic pole; wherein
    a fixed yoke is arranged to support the electromagnetic coil and magnetically coupled with the major magnetic pole;
    the fixed yoke includes projection portions extending upward from two opposed sides of the fixed yoke adjacent to an outer periphery of the electromagnetic coil so as to have a same height as the major magnetic pole; and
    the projection portions are arranged such that, when an inner edge of one of the magnets comes closest to the major magnetic pole within a swing range of the swing yoke, one of the projection portions comes closest to an outer edge of another one of the magnets arranged at an opposite side from the inner edge.

2. The rotary solenoid of claim 1, further comprising:
    stoppers arranged to restrict the swing motion of the swing yoke to a range of the specified angle $\theta$ in the forward and reverse directions; wherein
    when the swing yoke is swung in the forward or reverse direction and is restricted by one of the stoppers, a swing-direction magnetic center of a magnet of the magnets provided at a forward or reverse direction side is positioned at the reverse or forward direction side of the swing-direction center of one of the projection portions and a swing-direction magnetic center of another one of the magnets provided at the reverse or forward direction side is positioned at the reverse or forward direction side of the center of the major magnetic pole.

3. The rotary solenoid of claim 2, wherein, when the swing yoke is swung in the forward or reverse direction and is restricted by one of the stoppers, at least one of the magnets includes a region axially overlapping with the projection portion arranged at the forward or reverse direction side or the major magnetic pole.

4. The rotary solenoid of claim 3, wherein, when the swing yoke is swung in the forward or reverse direction and is restricted by one of the stoppers, the outer edge of the magnet arranged at the forward or reverse direction side is positioned at the swing-direction center of the projection portion arranged at the forward or reverse direction side.

5. The rotary solenoid of claim 3, wherein, when the swing yoke is swung in the forward or reverse direction and is restricted by one of the stoppers, the inner edge of the magnet arranged at the reverse or forward direction side is positioned at the center of the major magnetic pole.

6. The rotary solenoid of claim 5, wherein each of the mutually-adjoining inner edges of the magnets defines an approximately straight line passing through the center of the output shaft, the magnets arranged such that, with respect to a centerline passing through the center of the output shaft and bisecting the swing yoke, the approximately straight line makes an angle equal to the specified angle θ in the forward and reverse directions, the magnets configured such that, when the swing yoke is swung toward the forward direction side or the reverse direction side and is stopped, the approximately straight line of the inner edge of the magnet arranged at the reverse direction side or the forward direction side coincides with the center of the major magnetic pole.

7. The rotary solenoid of claim 6, wherein each of the magnets has a rectangular shape, the magnets arranged such that the approximately straight lines of the mutually-adjoining inner edges of the magnets make an angle equal to the specified angle θ with respect to the centerline of the swing yoke in the forward and reverse directions, respectively, an end surface of each of the projection portions arranged to define an angle of about 2θ with respect to a straight line interconnecting the center of the output shaft and the center of the major magnetic pole.

8. The rotary solenoid of claim 1, wherein the magnets, the swing yoke and the output shaft are unified into a swing rotor by a holder made of a non-magnetic molding material, the holder including contact portions positioned at swing-direction opposite sides of the swing rotor so as to make contact with stoppers to restrict a swing range of the swing yoke, the contact portions arranged nearer to the center than one half of a distance from the center of the output shaft to a radial outer end of the swing rotor.

9. The rotary solenoid of claim 8, wherein the electromagnetic coil, the fixed yoke, and the swing rotor are accommodated within a box-shaped case, and the stoppers are defined by side walls of the box-shaped case covering the swing-direction opposite sides of the swing rotor.

10. The rotary solenoid of claim 9, wherein a boss portion covering at least an outer periphery of a portion of the output shaft adjacent to the electromagnetic coil is provided with the holder of the swing rotor as a single monolithic member, the boss portion arranged to define a height position from a support wall of the box-shaped case when an end portion of the output shaft arranged at the side of the electromagnetic coil is supported on the support wall to secure a specified air gap between the magnets of the swing rotor and the electromagnetic coil.

11. The rotary solenoid of claim 10, wherein the end portion of the output shaft arranged at a side of the electromagnetic coil is rotatably supported by a slide bearing mounted to the support wall of the box-shaped case, the boss portion of the holder including an end surface making sliding contact with the slide bearing.

12. The rotary solenoid of claim 8, wherein the swing rotor is provided by combining the swing yoke and the output shaft together and then molding the holder by resin insert molding in a state where the magnets are attached to specified positions of the planar surface portion of the swing yoke.

13. The rotary solenoid of claim 1, wherein the projection portions of the fixed yoke are arranged into a shape conforming to the outer edges of the magnets so that, when the swing yoke is swung, each of the projection portions stands face-to-face with the outer edge of each of the magnets coming close to each of the projection portions over an entire length thereof.

\* \* \* \* \*